United States Patent [19]

Horn

[11] Patent Number: 5,477,687

[45] Date of Patent: Dec. 26, 1995

[54] PULLEY DRIVEN STIRLING CYCLE AUTOMATIVE AIR CONDITIONER SYSTEM

[75] Inventor: Stuart B. Horn, Oakton, Va.

[73] Assignee: Advanced Refrigeration Technology, Fredericksburg, Va.

[21] Appl. No.: 339,898

[22] Filed: Nov. 14, 1994

[51] Int. Cl.$^6$ ..................................................... F25B 9/00
[52] U.S. Cl. ............................................. 62/6; 62/323.4
[58] Field of Search ....................................... 62/6, 323.4

[56] References Cited

U.S. PATENT DOCUMENTS

| | | | |
|---|---|---|---|
| 4,158,293 | 6/1979 | Chellis | 62/6 |
| 4,843,826 | 7/1989 | Malaker | 62/6 |
| 5,072,597 | 12/1991 | Bromley et al. | 62/323.4 |

Primary Examiner—Ronald C. Capossela
Attorney, Agent, or Firm—Sherman and Shalloway

[57] ABSTRACT

An automotive air conditioning system utilizes environmentally safe gases as the working fluid for a Stirling cycle refrigeration unit. The Stirling cycle refrigeration unit includes a compressor housing and an expander housing. A first heat transfer fluid circulation system removes heat from the compressor housing and expels it to the ambient atmosphere. A second heat transfer fluid circulation system removes heat from the automotive interior and expels it to the expander housing. Each of the compressor housing and the expander housing contains an equal number of cylinders. Respective cylinders in the compressor housing and the expander housing are fluidically connected to one another; and the reciprocal movement of pistons disposed in these respective cylinders is maintained in a specified phase relationship.

17 Claims, 9 Drawing Sheets

PULLEY DRIVEN STIRLING CYCLE AUTOMATIVE AIR CONDITIONER SYSTEM

BACKGROUND OF THE INVENTION

1. Field of the Invention

This invention relates to automotive air conditioning systems. More particularly, this invention relates to an automotive air conditioning system utilizing environmentally safe gases as the working fluid.

2. Description of the Prior Art

U.S. Pat. No. 4,123,916 (Kreger) discloses an automotive heat pump comprising: a first closed refrigerant circuit having an evaporator in heat absorbing relationship with the engine cooling system and having a condenser exposed to air flowing through the passenger compartment, the first closed refrigerant system being effective to utilize the engine cooling system as a source of heat for the heating mode of the air conditioning system; a second closed refrigerant circuit having an evaporator exposed to air flowing through the passenger compartment and a condenser exposed to ambient air; the second closed refrigerant circuit utilizing the heat within the passenger compartment as a source of heat for extraction and thereby cooling the air; a compressor driven by the engine common to each of the circuits for pressurizing the refrigerant for conveyance to either of the condensers; and a control mechanism for selectively connecting the compressor with either of the circuits.

U.S. Pat. No. 4,180,984 (Cheilis) discloses cryogenic apparatus wherein the refrigerator has a reciprocable displacer, driven by a motor shaft, which must be coordinated with fluid control means to control the inlet and exhaust of high and low pressure fluid, respectively, to produce cooling; and wherein the improvement comprises including means for providing proper coordination between displacer movement and fluid control means regardless of the direction in which the motor driven shaft is rotated. In an embodiment of a "Stirling" cycle apparatus, a motor acts as a mechanical drive means for a main drive shaft contained in a rotatable relationship by bearings. A compressor assembly consists primarily of a piston which is contained within a housing and sealed therein. The piston is driven in a reciprocable manner through a connecting link by a crankpin, which is attached to the main drive shaft. The crankpin has an extension which engages a raised shoulder on the end of a secondary shaft which is supported by bearings. The crankpin extension may engage either side of the raised shoulder to drive the displacer in a reciprocating manner via a crankpin, yoke, bearings and drive shaft. When the motor rotates the main drive shaft in a clockwise direction, the crankpin extension immediately abuts the shoulder to rotate the secondary shaft in the clockwise direction. The result is that the displacer is reciprocated about 90° in advance of the movement of the compressor piston. However, if the main drive shaft were rotated in the counterclockwise direction for any reason, the crankpin extension would traverse approximately 270° without abutting the shoulder and without causing the secondary drive shaft to rotate. At this point, the secondary drive shaft would be rotated in the counterclockwise direction and the displacer would still be driven 90° in advance of the compressor piston.

U.S. Pat. No. 4,253,303 (Liljequist) discloses an engine incorporating the general principles of the "Stirling" cycle, comprising: a gas enclosure containing an entrapped gas, the gas enclosure including both a base portion and a power reciprocator, the gas enclosure defining internally thereof a variable volume expansion space and a variable volume compression space, flexible means sealingly connecting the base portion and the power reciprocator to minimize the escape of the entrapped gas between the base portion and the power reciprocation, yet allow relative movement therebetween; a displacer movably contained within the gas enclosure for moving the gaseous medium back and forth between the expansion space and the compression space; and an interconnection carried within the gas enclosure, connected to both the power reciprocator and the displacer, for interrelating the movement of the power reciprocator and the displacer in general accord with Stirling cycle characteristics.

U.S. Pat. No. 4,312,188 (Swenson, et al.) discloses an indoor space heating and cooling system, comprising: a refrigeration circuit having, in series relationship, a compressor and separate indoor and outdoor refrigeration circuit heat exchangers; a heat engine for driving the compressor while rejecting heat; a supplemental heat distribution circuit having indoor and outdoor rejected heat exchangers and means for conducting heat rejected from the heat engine to one or the other of the rejected heat exchangers; a first control means, in the refrigeration circuit, selectively settable to a cooling condition for directing refrigerant from the compressor through the outdoor and then through the indoor refrigeration circuit heat exchangers and back to the compressor or to a heating condition for directing refrigerant from the compressor through the indoor and then through the outdoor refrigeration circuit heat exchangers and back to the compressor; and a second control means, in the supplemental heat distribution circuit, selectively settable to a cooling condition for directing rejected heat from the heat engine to the outdoor rejected heat exchanger when the first control means is in its cooling condition or to a heating condition for directing rejected heat from the heat engine to the indoor rejected heat exchanger when the first control means is in its heating condition. The heat engine is of a type employing, throughout its cycle, a gas as its working fluid and wherein the working temperatures of the gas are substantially higher than the temperature desired to be maintained in the indoor space conditioned by the system. The heat engine may be a Rankine cycle engine or a non-Rankine cycle engine (e.g., a Stirling engine, an Otto engine, a Diesel engine or a Brayton engine).

U.S. Pat. 4,330,992 (Senft) discloses a drive mechanism for driving the displacer of a crank-type Stirling engine at the same frequency but out of phase with the power piston of the engine. A biasing means is linked to the displacer for applying a biasing force which urges the displacer in one direction of its reciprocation. A flexible band is secured to the displacer for applying a force opposite to the biasing force, with the other end of the band secured to an anchor which is mounted on another part of the apparatus and with the band extending slideably across at least one and preferably two bearing surfaces intermediate its secured ends.

U.S. Pat. No. 4,748,823 (Asano, et al.) discloses an automotive freezer-refrigerator system, comprising: a compressor driven by an automotive engine for compressing refrigerant; a freezing chamber having therein a freezing cold storage member having freezing cold storage material therein and a freezing evaporator in said chamber arranged outside and closely to the freezing cold storage member; a refrigeration chamber including a refrigeration cold storage member having therein refrigeration cold storage material higher in freezing temperature than the freezing cold storage member and a refrigeration evaporator in the refrigeration chamber arranged outside and in close contact with the refrigeration cold storage member; a valve means for controlling the flow of the refrigerant passing serially through the freezing evaporator and the refrigeration evaporator from the compressor so that the respective freezing and refrigeration evaporators are charged with a refrigerant at a substantially uniform pressure; a temperature sensor for detecting a temperature of the refrigeration chamber; and a control circuit for electrically controlling the operation of the valve means on the basis of a signal from the temperature sensor indicative of the temperature of the refrigeration chamber.

U.S. Pat. No. 4,796,430 (Malaker, et al.) discloses a cam drive for a cryogenic refrigerator, such as a modified Stirling cycle refrigerator, which is implemented either as a rotatable cylinder having a pair of circumferential camming grooves or as wobble plates having camming tracks on the periphery thereof. The cam drive unit drives the compressor and expander pistons of the refrigerator through cam followers.

U.S. Pat. No. 4,796,438 (Sato) discloses a method and apparatus for controlling an automotive air conditioning system which includes a temperature detecting sensor disposed in proximity to the air conditioning system, an acceleration detecting device for detecting acceleration of the automobile and a control unit. The control unit compares the detected air temperature with predetermined temperatures and controls the capacity of the compressor in accordance with the compared results and the acceleration condition of the automobile. The temperature in a compartment of the automobile can thus be controlled at a comfortable level and the power load imposed on the automobile engine can be reduced by operating the compressor at a reduced capacity.

U.S. Pat. No. 4,843,826 (Malaker) discloses a vehicle air conditioning system in which air or a working liquid is circulated through a heat exchanger mounted in intimate thermal contact with the cold head of a modified Stirling cycle refrigerator. The working liquid is circulated through a heat conductive tube to the location of the vehicle to be cooled. Second heat exchangers are connected to the tube at each of the locations and the air to be cooled is blown through the second heat exchangers. If air is circulated through the cold head mounted heat exchanger, the cooled air is ducted to the locations in the vehicle to be cooled.

The refrigerator is driven by an electrical motor and includes at least one compressor and expander piston pair driven by the motor. The refrigerator is encased in a hermetically sealed case whose interior is filled with a working gas which is preferably helium, although nitrogen can also be used.

Since the Stirling cycle refrigerator is electrically driven, there are relatively few restrictions on its placement in the vehicle. The electric power may be provided by a generator driven by the vehicle motor or the generator may be separately powered by an auxiliary motor.

U.S. Pat. No. 4,996,841 (Meijer, et al.) discloses a Stirling cycle heat pump for heating and cooling systems. The Stirling engine may be powered by direct heat input through combustor assemblies, a power take-off shaft can be provided to an external load such as an alternator or a generator; or may be powered by an electric induction motor as the prime mover; or may be driven by a pulley of an automotive internal combustion engine.

U.S. Pat. No. 5,094,083 (Horn, et al.) discloses a Stirling cycle air conditioning system which comprises a closed loop cooling system using a circulating coolant fluid as a heat transfer medium and includes a first heat exchange means for cooling a selected area, a means for circulating the coolant to the first heat exchanger and a Stirling cycle cooler having a second heat exchanger means for removing heat from the recirculating heat-laden coolant. The Stirling cycle cooler is hermetically sealed and employs an environmentally safe non-freon base coolant and has a magnetic clutch for coupling a pulley drive thereto. A first magnetic coupling magnetically couples shaft power of the driven pulley to a first end of a crankshaft of the Stirling cycle cooler through a first end wall of the hermetically sealed cooler. A second magnetic coupling magnetically couples a second end of the cooler crankshaft through a second end wall of the hermetically sealed cooler to an impeller pump for pumping the coolant through the closed loop system.

SUMMARY OF THE INVENTION

The present invention provides an air conditioning system comprising: (A) a Stirling cycle refrigeration unit which comprises a compressor housing having at least one compressor cylinder containing a compressor piston member, the compressor piston member being slidingly received within the compressor cylinder for reciprocating motion therein, the compressor cylinder and the compressor piston member defining a compressor volume; an expander housing having at least one expander cylinder containing an expander piston member, the expander piston member being slidingly received within the expander cylinder for reciprocating motion therein, the expander cylinder and the expander piston member defining an expander volume; a fluidic connection for fluidically connecting each compressor volume in the compressor housing with a corresponding expander volume in the expander housing; a first drive, disposed within the compressor housing, for reciprocating each compressor piston member within its compressor cylinder; a second drive, disposed within the expander housing, for reciprocating each expander piston member within its expander cylinder; the first and second drives cooperate to maintain a predetermined phase relationship between each compressor piston member in its compressor cylinder and each expander piston member in its expander cylinder whose compressor volume and expander volume are fluidically connected; (B) a compressor-side heat exchanger for transferring heat from the compressor housing to a first heat transfer fluid; (C) an expander-side heat exchanger for transferring heat from a second heat transfer fluid to the expander housing; (D) a first external heat exchanger for transferring heat from the first heat transfer fluid to a first ambient atmosphere; (E) a second external heat exchanger for transferring heat from a second ambient atmosphere to said second heat transfer fluid; (F) a first fluid circulator for circulating the first heat transfer fluid from the compressor-side heat exchanger to the first heat exchanger and back to the compressor-side heat exchanger; (G) a second fluid circulator for circulating the second heat transfer fluid from the expander-side heat exchanger to the second external heat exchanger and back to the expander side heat exchanger; (H) a shaft, connected to the first fluid circulator and the second fluid circulator, for transmitting motive power to the first fluid circulator and the second fluid circulator; (I) a magnetic coupling, magnetically coupling the shaft to the first drive and the second drive, for transmitting motive power to the first drive and the second drive; and (J) a clutch for selectively connecting the shaft to a power supply.

In a preferred embodiment, the compressor housing has four compressor cylinders disposed in a first plane, each compressor cylinder disposed at a 90° angle to each adjacent cylinder to form a cross head, each compressor cylinder having a compressor piston member slidingly received therein for reciprocating motion therein, the compressor piston members being connected by a yoke; and the expander housing has four expander cylinders disposed in a second plane, each expander cylinder disposed at a 90° angle to each adjacent cylinder to form a cross head, each expander cylinder having an expander piston member slidingly received therein for reciprocating motion therein, the expander piston members being connected by a yoke; each of the compressor cylinders being fluidically connected with a corresponding expander cylinder.

BRIEF DESCRIPTION OF THE DRAWING FIGURES

DETAILED DESCRIPTION OF THE INVENTION

Figure 1:
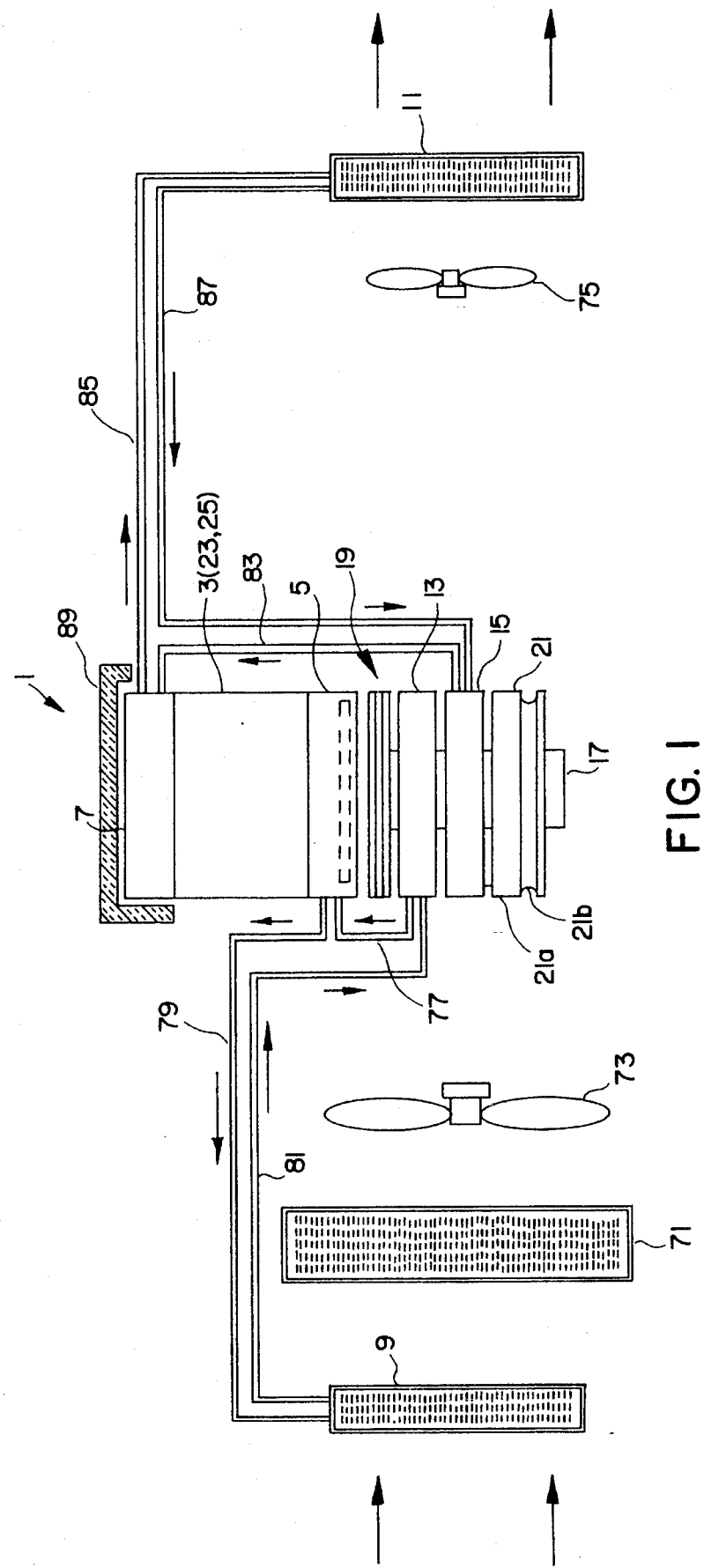
FIG. 1 is a schematic view of the air conditioning system of the present invention in use in an automobile.
Figure 2:
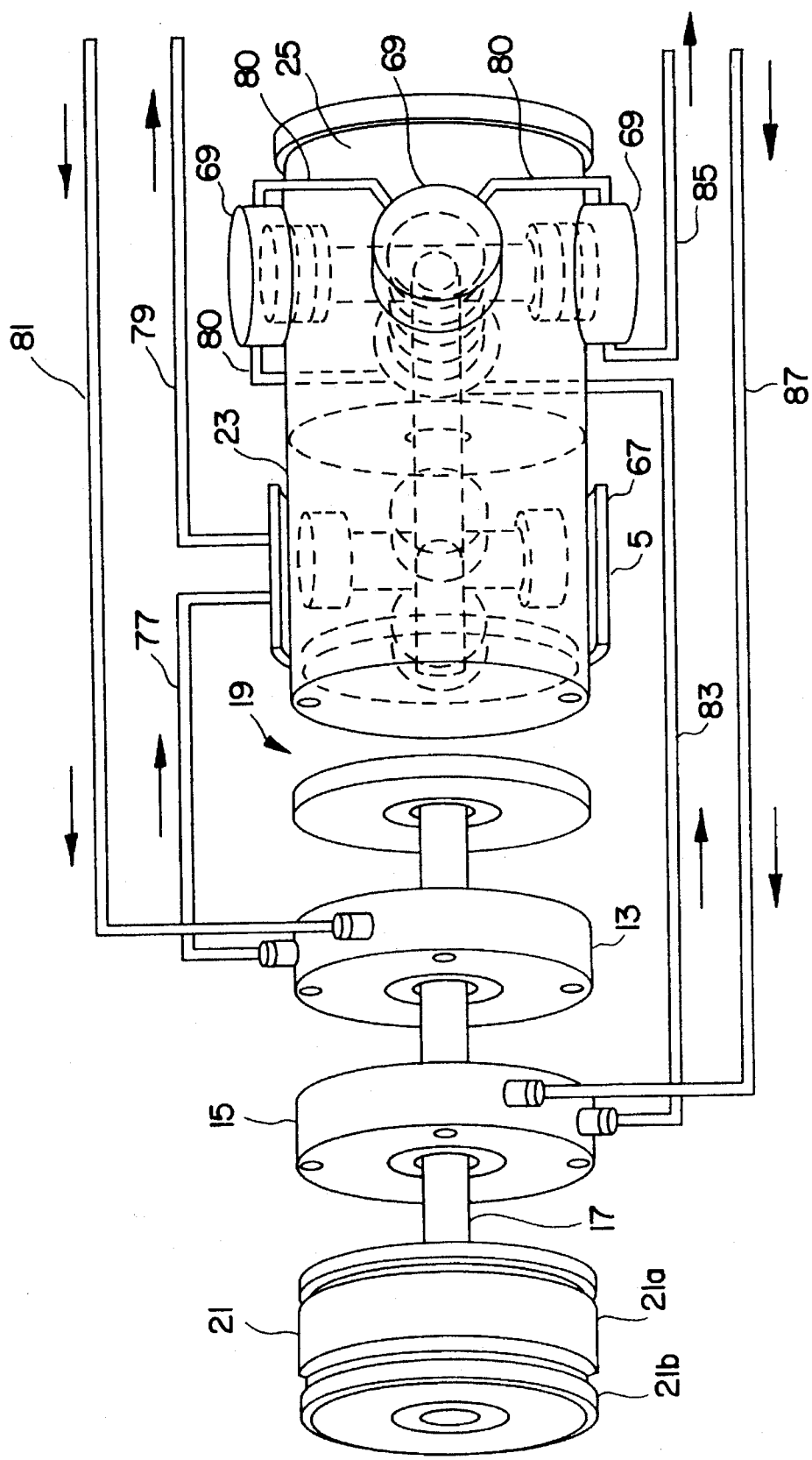
FIG. 2 is a partial exploded view of the air conditioning system of the present invention as illustrated in FIG. 1.

FIG. 1 is a schematic view of the air conditioning system of the present invention in use in an automobile. The air conditioning system 1 comprises a Stirling cycle refrigeration unit a compressor-side heat exchanger 5, an expander side heat exchanger 7, a first external heat exchanger 9, a second external heat exchanger 11, a first pump 13, a second pump 15, a shaft 17, a magnetic coupling 19 and a clutch 21.

The Stirling cycle refrigeration unit 3 comprises a compressor housing 23 and an expander housing 25. The compressor housing 25 has at least one compressor cylinder, preferably four compressor cylinders 27, 28, 29, 30, formed therein. Each compressor cylinder contains a compressor piston member 31, 32, 34 slidingly received within its respective compressor cylinder for reciprocating motion therein. Each compressor cylinder 28, 29, 30 and its respective compressor piston member 31, 32, 33, 34, defines a respective compressor volume 35, 36, 37, 38. The expander housing 25 has at least one expander cylinder, preferably four expander cylinders 39, 40, 41, 42, formed therein. Each expander cylinder contains an expander piston member 43, 44, 45, 46, slidingly received within its respective expander cylinder for reciprocating motion therein. Each expander cylinder 39, 40, 41, 42 and its respective expander piston member 43, 44, 45, 46 defines a respective expander volume 47, 48, 49, 50. Each of the compressor volumes 35, 36, 37 and 38 is fluidically connected to a corresponding expander cylinder 42, 39, 40 and 41 by a pressure resistant passage 51, 52, 53 and 54, respectively.

Disposed within the compressor housing 23 is a shaft member 55 supported, for rotation, by bearings (not shown) that carries a cam 57, which in conjunction with a yoke assembly 59, causes reciprocation of the compressor piston members 31, 32, 33 and 34 within their respective compressor cylinders 27, 28, 29 and 30, upon rotation of the shaft member 55.

Shaft member 55 extends into expander housing 25 where it is also supported, for rotation, by bearings (not shown) and carries a second cam 63, which in conjunction with a yoke assembly 65, causes reciprocation of the expander piston members 43, 44, 45 and 46 within their respective expander cylinders 39, 40, 41 and 42, upon rotation of the shaft member 55.

The cams 57 and 63 are phased so that the compressor piston member and the expander piston member in respective compressor cylinders and expander cylinders, whose compressor volume and expander cylinder are fluidically connected, are 90° out of phase.

The compressor housing 23 is fitted with a compressor side heat exchanger 5 which may comprise a jacket 67 disposed about the outer surface of the compressor housing 23 to hold a heat transfer fluid in contact with the outer surface of the compressor housing.

The expander housing 25 contains an expander side heat exchanger 7 which comprises four cap jackets 69, which are fluidically connected by conduits 80 and formed integrally with the outer end surfaces of the expander cylinders 39, 40, 41 and 42 to hold a heat transfer fluid in contact with the outer end surfaces of the expander cylinders.

Figure 3:
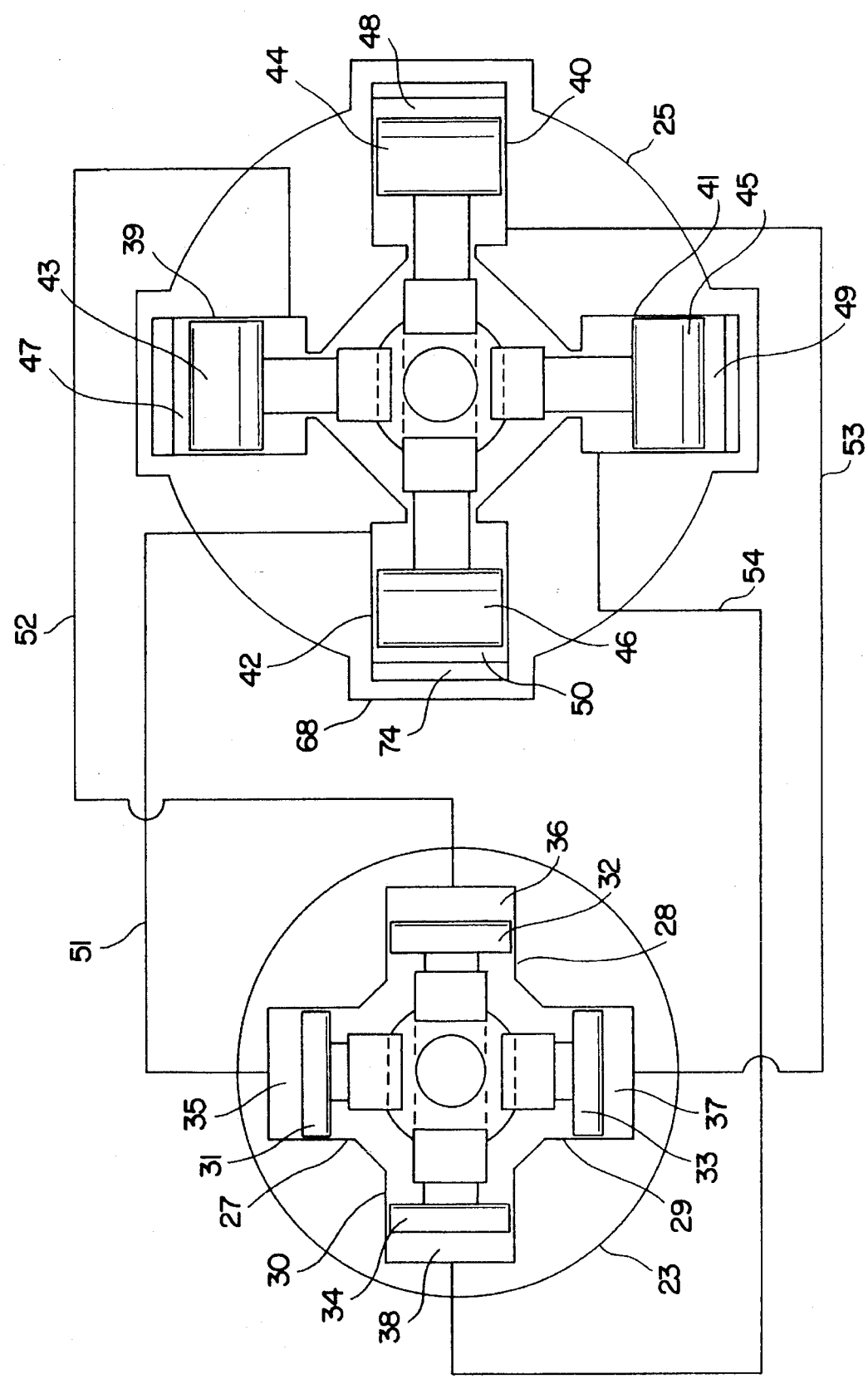
FIG. 3 is an illustration of the compressor-expander interconnection according to a preferred embodiment of the present invention.
Figure 3A:
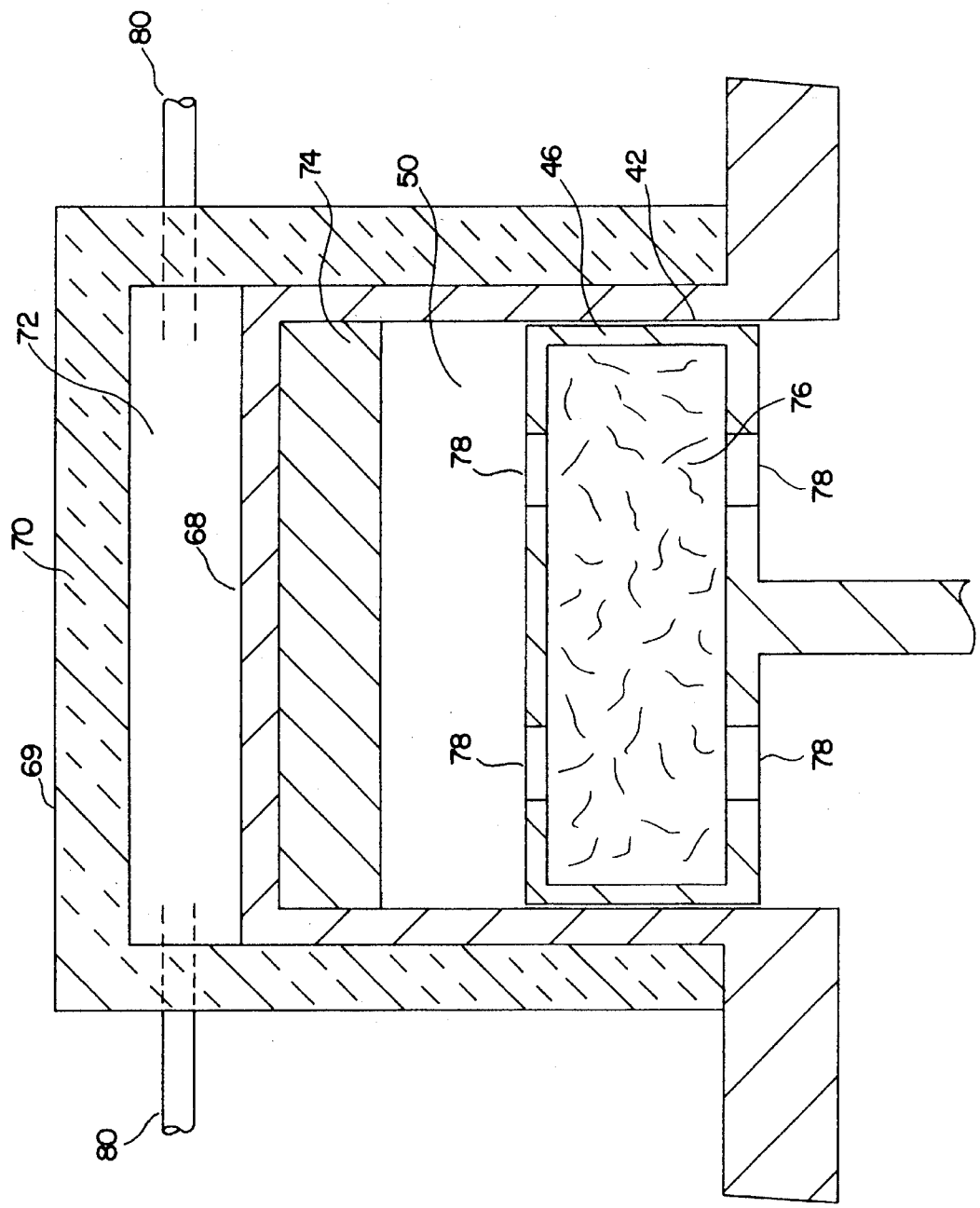
FIG. 3A is a partial sectional view of the outer portion of an expander cylinder.
Figure 4:
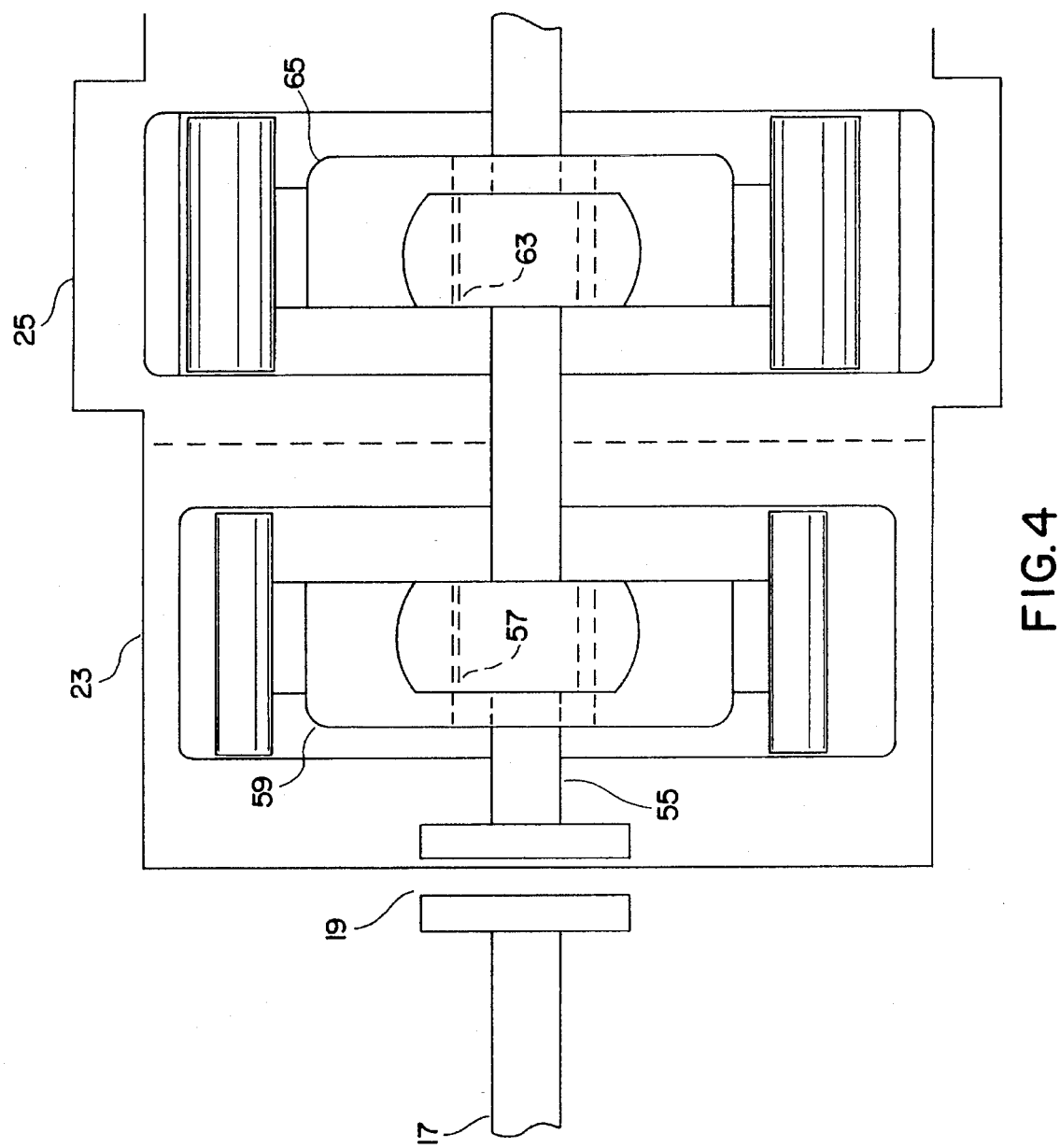
FIG. 4 is an illustration of the magnetic coupling of the compressor and the expander according to the present invention.

As may best be seen in FIG. 3A, the outer end surface 68 of expander cylinder 42 has a cap jacket 69, made of a thermally insulative material 70, formed integrally therewith, so as to provide a fluid flow volume 72. This fluid flow volume may be filled with a porous material (not shown) or may be provided with a serpentine channel (not shown) or may be provided with baffles (not shown) to ensure adequate heat transfer area between a heat transfer fluid flowing through conduits 80 (and fluid flow volume 72) and the outer end surface of expander cylinder 42.

Inside expander cylinder 42, a gas permeable, thermally conductive material 74, e.g., a metallic gauze, is formed integrally with the outer end surface 68 of the expander cylinder so as to provide increased surface area for heat transfer between the gas contained in expander volume 50 and the outer end surface 68.

The expander piston member 46 is hollow and filled with vanes of metal or porous material, 76, and is provided with passages 78 whereby gas may pass through piston member 46 and be forced into contact with the metal vanes or wool contained within the piston member.

Figure 6A:
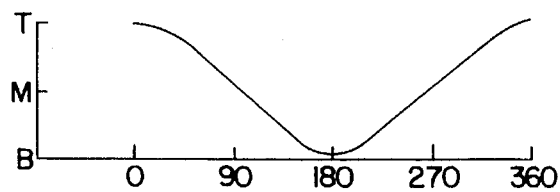
FIGS. 6A–6H depict the phase relationship of the piston member positions within the cylinders of the compressor and the expander.
Figure 6B:
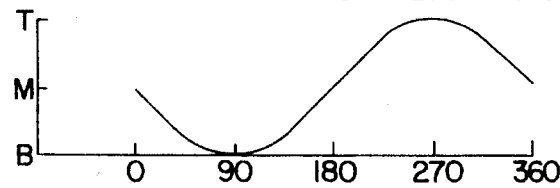
Figure 6C:
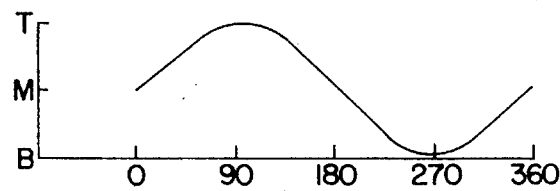
Figure 6D:
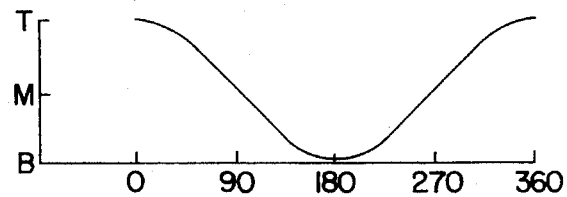
Figure 6E:
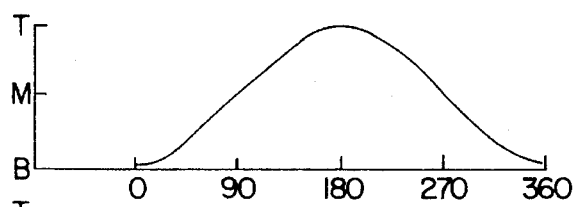
Figure 6F:
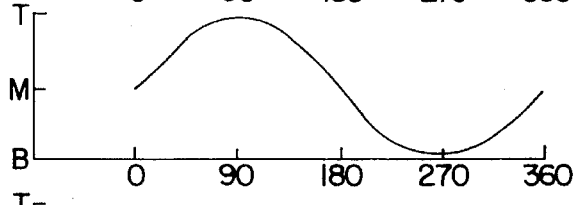
Figure 6G:
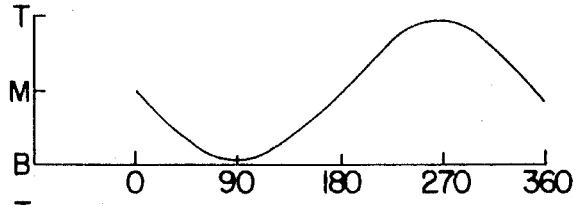
Figure 6H:
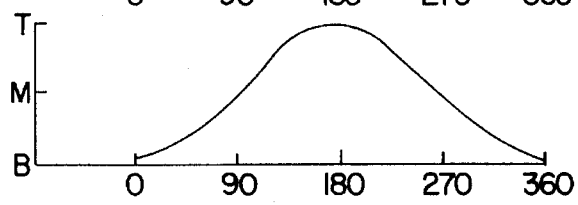

In operation, the compressor, i.e., compressor cylinder 27 and compressor piston member 31 provide a sinusoidally varying pressure to expander cylinder 42. This pressure would correspond to the position of piston member 31 in compressor cylinder 27 as shown in FIG. 6A, i.e., when the piston is at the top (T) of the cylinder, the pressure is highest, and when the piston is at the bottom (B) of the cylinder, the pressure is lowest. At the same time, expander piston member 46 follows the path shown in FIG. 6B. Thus, expander piston member 46 is moving upward (and hence causing compression of volume 50) at 90° to 270° while the pressure supplied by the compressor is at its lowest average value from 270° back to 90° expander piston member 46 is moving downward (and hence causing expansion of volume 50) while the pressure supplied by the compressor is at its highest average value. In toto, this results in the gas in volume 50 doing net work and thus absorbing heat from the outer end surface 68 through the gas permeable thermally conductive material 74 (and hence cooling the heat transfer fluid passing through fluid flow volume 72.

While the above discussion has been particularly discussed with respect to expander cylinder 42, the other expander cylinders are designed in the same manner and provide the same function as discussed above.

The first external heat exchanger 9 may take the form of a radiator for the indirect contact of a heat transfer fluid with the ambient atmosphere. (In automotive applications, this heat exchanger 9 would be positioned where the conventional condenser coils of a vapor-liquid phase change refrigeration system were located, i.e., in the air path (large arrows) in front of the car radiator 71 and the engine cooling fan 73.)

The second external heat exchanger 11 may also take the form of a radiator for the indirect contact of a heat transfer fluid with the ambient atmosphere. (In automotive applications, this heat exchanger would be positioned where the conventional evaporator coils of a vapor-liquid phase change refrigeration system were located, e.g., in the path (large arrows) of air being blown by a blower into the passenger compartment of an automobile.)

The first pump 13 circulates a heat transfer fluid (whose flow path is shown by small arrows) through a first conduit 77 from pump 13 to a compressor-side heat exchanger 5, through a second conduit 79 from compressor-side heat exchanger 5 to external heat exchanger 9, and through a third conduit 81 from the external heat exchanger 9 back to pump 13. (Alternatively, such pump could be replaced by a heat pipe system.)

The second pump 15 circulates a heat transfer fluid (whose flow path is shown by small arrows) through a fourth conduit 83 from pump 15 to expander-side heat exchanger 7, through a fifth conduit 85 from expander-side heat exchanger 7 to external heat exchanger 11, and through a sixth conduit 87 from the external heat exchanger 11 back to pump 15. As indicated at 89, insulation is provided to thermally isolate the expander-side heat exchanger 7 from the ambient atmosphere. Similarly, the conduits 83, 85 and 87 should also be insulated, especially in the high temperature environment of an automotive engine compartment. (Alternatively, such pump could be replaced by a heat pipe system.)

The pumps 13 and 15 are driven by shaft 17 which supplies rotary power thereto. The shaft 17, through magnetic coupling 19, also supplies rotary power to shaft member 55, to drive yoke assembly 59 via cam 57; and yoke assembly 65 via cam 63.

The clutch 21 actually comprises an electric clutch 26, engageable of shaft 17, connected to a pulley 21b, engageable of a drive belt (not shown) driven by the crankshaft of an engine. Upon detection of the activation of the air conditioning system, clutch 21, which has been rotating freely on shaft 17 (driven by a drive belt engaging pulley 21b) engages shaft 17, thereby supplying motive power to pumps 13 and 15 and the Stirling cycle refrigeration unit. Typically, the Stirling cycle refrigeration unit will be sized to provide adequate refrigeration for its intended use (e.g., the temperature and humidity control requirements of an automotive passenger compartment) at engine idle speed, e.g., about 650 RPM, for the automotive internal combustion engine. When the engine speed exceeds a predetermined speed, e.g., exceeds about 2000 RPM, magnetic coupling 19 is subject to slippage which maintains the shaft speed of shaft 17 at less than about 2000 RPM. Thus, even at idle, adequate cooling is provided; while at highway speed, excessive cooling is not generated.

Figure 5:
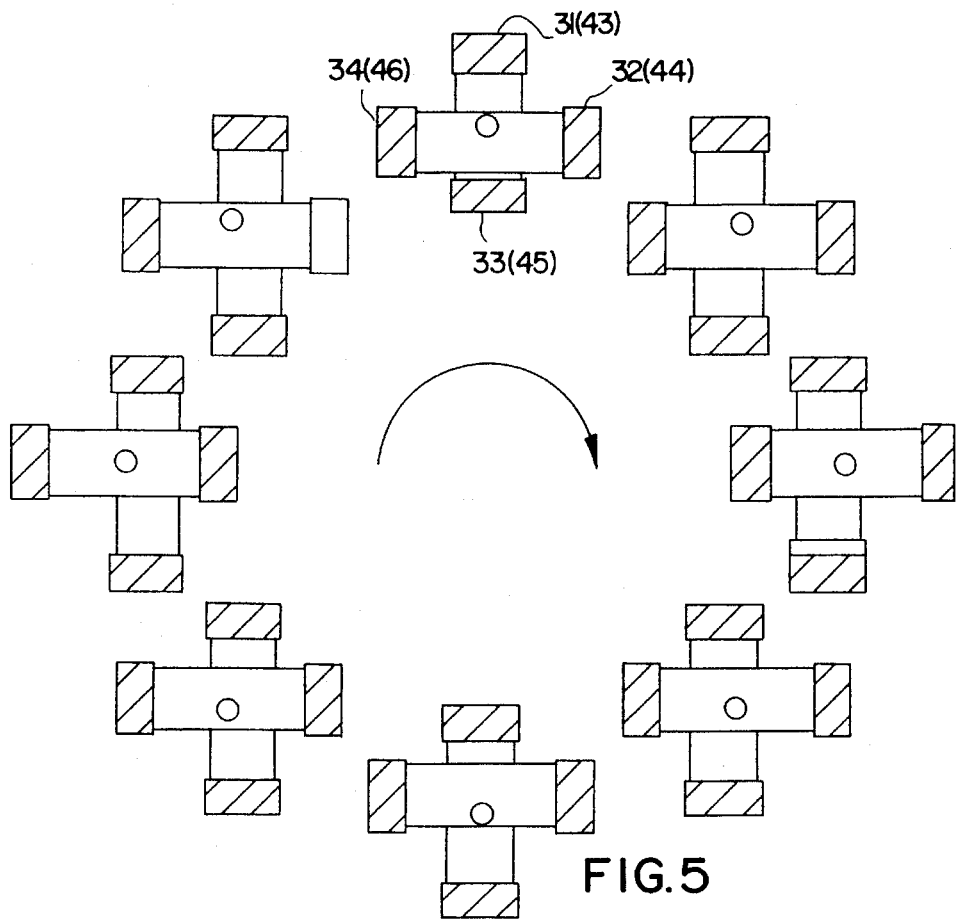
FIG. 5 is an illustration depicting the operation of the yoke utilized in the present invention.

FIG. 5 illustrates the relative positions of compressor piston members 31, 32, 33 and 34 (expander piston members 43, 44, 45 and 46) in a single rotation of shaft member 55 when driven through yoke assembly 59 (yoke assembly 65) by cam 57 (cam 63).

Similarly, FIGS. 6A, 6C, 6E and 6G show the relative position (T=top of stroke, M=mid-stroke, B=bottom of stroke) of compressor piston members 31, 32, 33 and 34, respectively, through a single rotation of shaft member 55. FIGS. 6B, 6D, 6F and 6H show the relative position of expander piston members 46, 43, 44, 45, respectively, through a single rotation of shaft member 55. Thus, by fluidically linking the expander cylinders and compressor volumes as shown in FIG. 3, the respective piston member positions as shown in FIGS. 6A and 6B, 6C and 6D, 6E and 6F, and 6G and 6H, are 90° out of phase.

As shown in FIGS. 7, 8, 9A, 9B, 9C, 10A, 10B, 11A and 11B, the yoke 59 (65) links piston member 31, 32, 33 and 34 (43, 44, 45 and 46) through piston supports 93 and 95 and lock block 97.

Lock block 97 has a bore 99 therethrough which is receivable of cam 57 (63) therein. Piston supports 93 and 95 contain corresponding bores 101 and 103.

Figure 7:
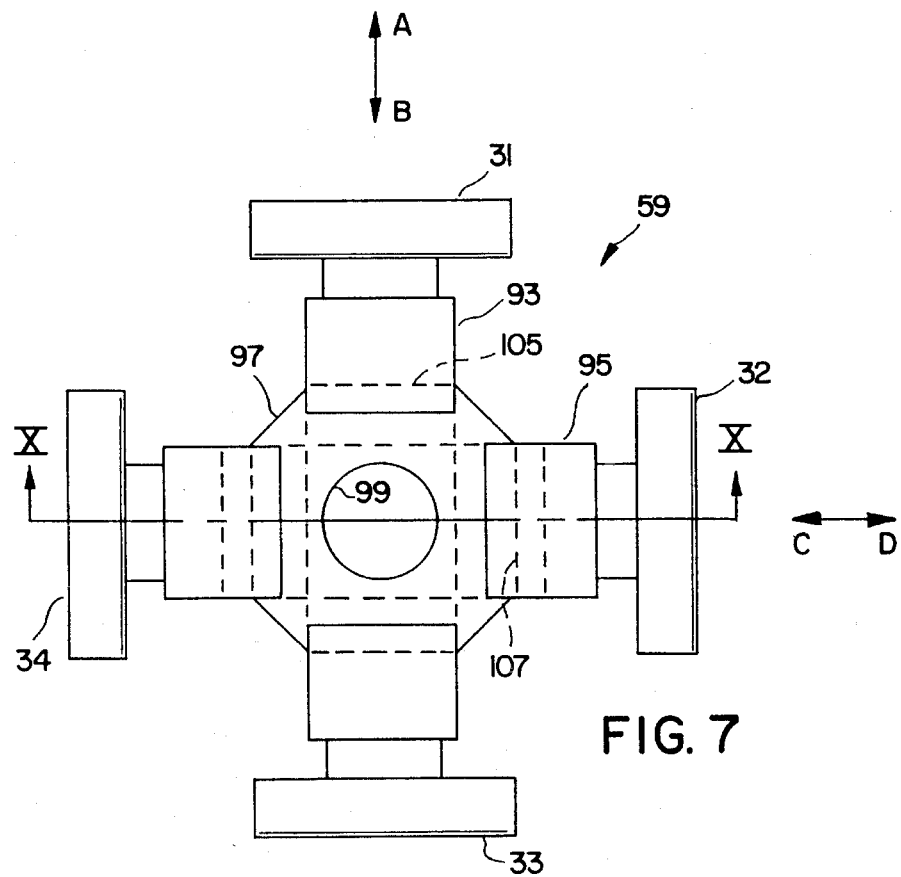
FIG. 7 is an illustration of the yoke assembly utilized in the present invention.
Figure 9B:
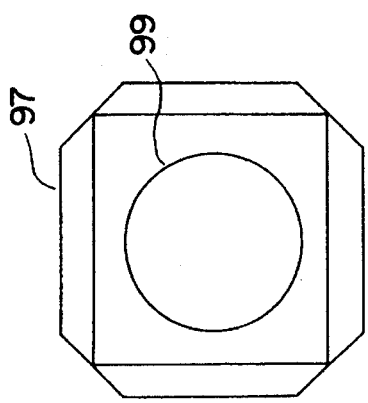
FIGS. 9A, 9B and 9C are end, side and bottom views, respectively, of the lock block of the yoke assembly of FIG. 7.
Figure 9C:
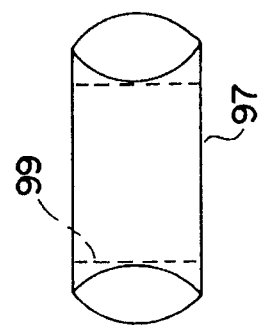
Figure 9A:
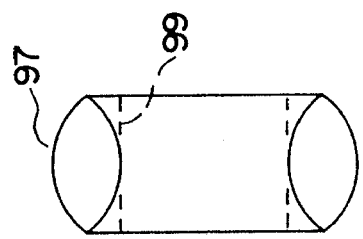
Figure 8:
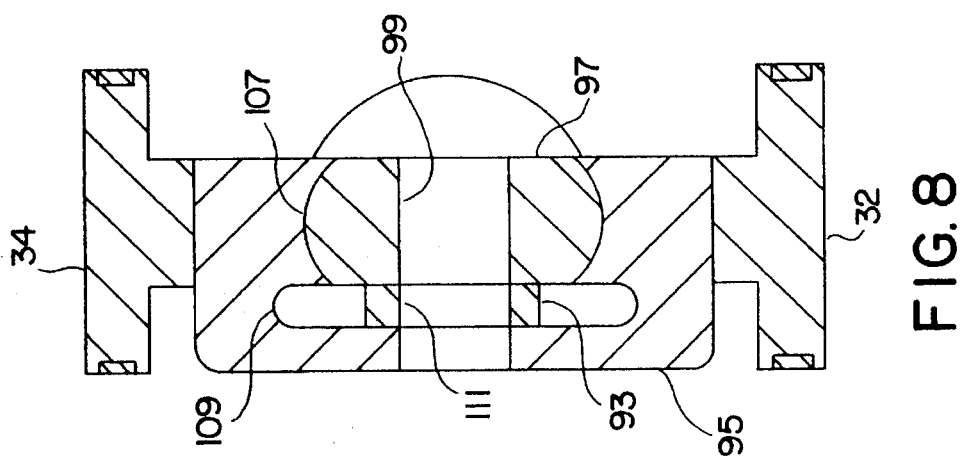
FIG. 8 is a cross-section of the yoke assembly of FIG. 7, taken along X—X.
Figure 11B:
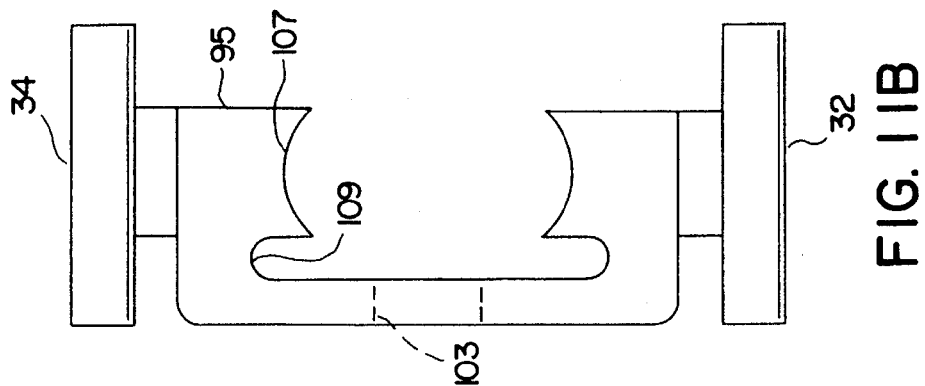
FIGS. 11A and 11B are front and side views, respectively, of a second piston assembly of the yoke according to FIG. 7.
Figure 11A:
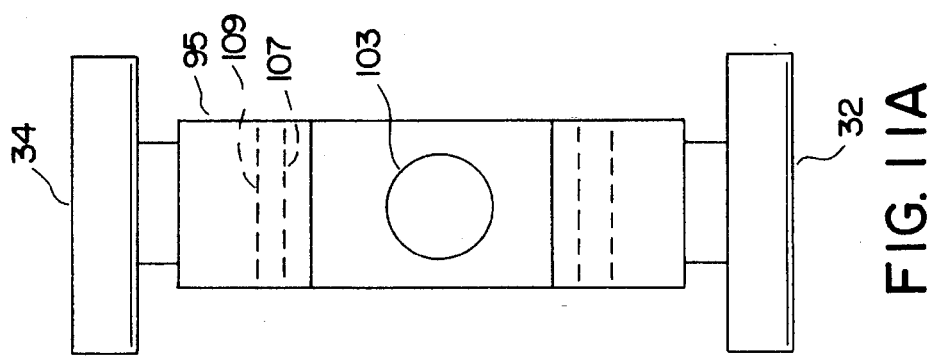
Figure 10B:
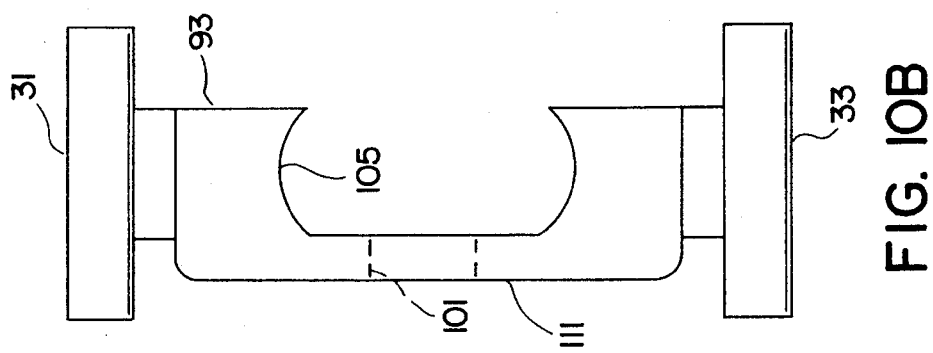
FIGS. 10A and 10B are front and side views, respectively, of a first piston assembly of the yoke according to FIG. 7.
Figure 10A:
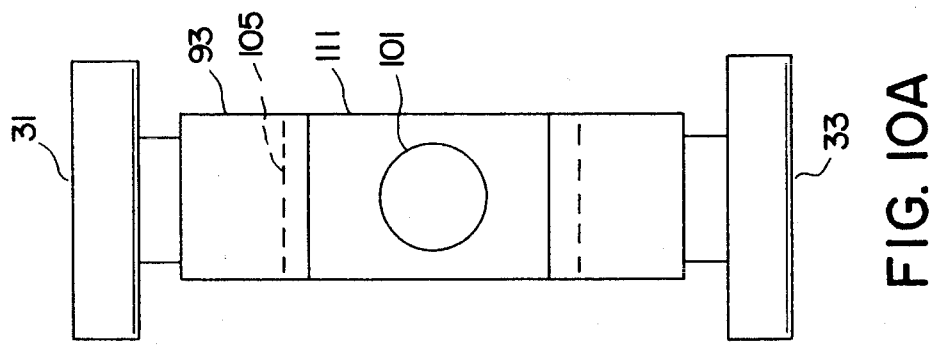

Piston support 93 contains cut out 105 which is slidingly receivable of lock block 97. Similarly, piston support 95 contains a first cut out 107 which is also slidingly receivable of lock block 97. Additionally, piston support 95 contains a second cut out 109 which provides a clearance, upon assembly of the yoke, for connecting portion 111 of piston support 93. Thus, as shown in FIGS. 7 and 8, upon assembly of the yoke, piston support 93 (and hence piston members 31 (43) and 33 (45)) may reciprocably slide relative to piston support 95 as shown by arrows A–B; and piston support 95 (and hence piston members 32 (44) and 34 (46)) may reciprocably slide relative to piston support 93 as shown by arrows C–D.

What is claimed is:

1. An air conditioning system comprising:
   (A) a Stirling cycle refrigeration unit comprising
       a compressor housing having at least one compressor cylinder containing a compressor piston member, said compressor piston member slidingly received within said compressor cylinder for reciprocating motion therein, said compressor cylinder and said compressor piston member defining a compressor volume,
       an expander housing having at least one expander cylinder containing an expander piston member, said expander piston member slidingly received within said expander cylinder for reciprocating motion therein, said expander cylinder and said expander piston member defining an expander volume, fluidic connection means for fluidically connecting each compressor volume in said compressor housing with a corresponding expander volume in said expander housing, first drive means, disposed within said compressor housing, for reciprocating each compressor piston member within its compressor cylinder, second drive means, disposed within said expander housing for reciprocating each expander piston member within its expander cylinder said first and second drive means cooperating to maintain a predetermined phase relationship between each compressor piston member in its compressor cylinder and each expander piston member in its expander cylinder whose compressor volume and expander volume are fluidically connected;

(B) a compressor-side heat exchanger for transferring heat from said compressor housing to a first heat transfer fluid;

(C) an expander-side heat exchanger for transferring heat from a second heat transfer fluid to said expander housing;

(D) a first external heat exchanger for transferring heat from said first heat transfer fluid to a first ambient atmosphere;

(E) a second external heat exchanger for transferring heat from a second ambient atmosphere to said second heat transfer fluid;

(F) a first fluid circulating means for circulating said first heat transfer fluid from said compressor-side heat exchanger to said first heat exchanger and back to said compressor-side heat exchanger;

(G) a second fluid circulating means for circulating said second heat transfer fluid from said expander-side heat exchanger to said second external heat exchanger and back to said expander-side heat exchanger;

(H) a shaft means, connected to said first fluid circulating means and said second fluid circulating means, for transmitting motive power to said first fluid circulating means and said second fluid circulating means;

(I) magnetic coupling means, magnetically coupling said shaft means to said first drive means and said second drive means, for transmitting motive power to said first drive means and said second drive means;

(J) clutch means for selectively connecting said shaft means to a power supply.

2. The air conditioning system according to claim 1, wherein said compressor housing has four compressor cylinders disposed in a first plane, each compressor cylinder disposed at a 90° angle to each adjacent cylinder to form a cross head, each compressor cylinder having a compressor piston member slidingly received therein for reciprocating motion therein, said compressor piston members connected by a yoke.

3. The air conditioning system according to claim 2, wherein said expander housing has four expander cylinders disposed in a second plane, each expander cylinder disposed at a 90° angle to each adjacent cylinder to form a cross head, each expander cylinder having an expander piston member slidingly received therein for reciprocating motion therein, said expander piston members connected by a yoke.

4. The air conditioning system according to claim 3, wherein each of said compressor cylinders having a compressor piston member therein has a compressor volume, each of said expander cylinders having an expander piston member therein has an expander volume, each compressor volume being fluidically connected with a corresponding expander cylinder.

5. The air conditioning system according to claim 1, wherein said compressor-side heat exchanger comprises a jacket disposed about an outer surface of said compressor housing for containing said first heat transfer fluid in contact with said outer surface of said compressor housing.

6. The air conditioning system according to claim 5, wherein said outer surface of said compressor housing has an expanded surface area.

7. The air conditioning system according to claim 6, wherein said expanded surface area is formed by fins mounted on said outer surface of said compressor housing.

8. The air conditioning system according to claim 1, wherein said expander-side heat exchanger comprises a jacket disposed about an outer surface of said expander housing for containing said second heat transfer fluid in contact with an outer end surface of said at least one expander cylinder.

9. The air conditioning system according to claim 8, wherein said at least one expander cylinder contains an expanded surface area member in contact with an outer end of said expander cylinder.

10. The air conditioning system according to claim 9, wherein said expanded surface area is formed by a metallic gauze.

11. The air conditioning system according to claim 1, wherein said first external heat exchanger comprises a first radiator for indirectly contacting said first heat transfer fluid with said first ambient atmosphere.

12. The air conditioning system according to claim 1, wherein said second external heat exchanger comprises a second radiator for indirectly contacting said second heat transfer fluid with said second ambient atmosphere.

13. The air conditioning system according to claim 12, wherein said second external heat exchanger further comprises blower means for mechanically forcing at least a portion of said second ambient atmosphere to pass over said second radiator.

14. The air conditioning system according to claim 1, wherein said first fluid circulating means comprises a first pump, connected to said shaft means, for circulating said first heat transfer fluid, said first pump having an inlet and an outlet, a first fluid conduit connecting the outlet of said first pump to an inlet of said compressor-side heat exchanger, a second fluid conduit connecting an outlet of said compressor-side heat exchanger to an inlet of said first external heat exchanger, a third fluid conduit connecting an outlet of said first external heat exchanger to the inlet of said first pump.

15. The air conditioning system according to claim 14, wherein said second fluid circulating means comprises a second pump, connected to said shaft means, for circulating said second heat transfer fluid, said second pump having an inlet and an outlet, a fourth fluid conduit connecting the outlet of said second pump to an inlet of said expander-side heat exchanger, a fifth fluid conduit connecting an outlet of said expander-side heat exchanger to an inlet of said second external heat exchanger, a sixth fluid conduit connecting an outlet of said second external heat exchanger to the inlet of said second pump.

16. The air conditioning system according to claim 1, wherein said first drive means comprises a first eccentric crankshaft disposed within said compressor housing, said first eccentric crankshaft having a first end and a second end; said second drive means comprises a second eccentric crankshaft disposed within said expander housing, said second eccentric crankshaft having a first end and a second end, said magnetic coupling means comprising a magnetic coupling between said shaft means and said first end of said first eccentric crankshaft, said second end of said first eccentric crankshaft being connected to said first end of said second eccentric crankshaft.

17. The air conditioning system according to claim 1, wherein said clutch means is connected to a source of rotational power and said clutch means connects said shaft means to said source of rotational power in response to a signal indicative of a need for air conditioning; said magnetic coupling permitting said shaft means to slip relative to said first eccentric crankshaft when said source of rotational power has a rotational velocity in excess of a predetermined maximum rotational velocity.

* * * * *